United States Patent [19]  
Moslo

[11] 3,771,936  
[45] Nov. 13, 1973

[54] SAFETY DEVICE FOR MOLDING MACHINE
[76] Inventor: Ernest P. Moslo, 12700 Lake Ave., Lakewood, Ohio
[22] Filed: May 12, 1971
[21] Appl. No.: 142,472

[52] U.S. Cl. .......................... 425/153, 425/DIG. 45
[51] Int. Cl. ........ B30b 15/00, B29f 1/00, F16p 3/12
[58] Field of Search.................... 425/135, 136, 151, 425/152, 153, 154, DIG. 45; 18/30 CS, 30 CM

[56] References Cited  
UNITED STATES PATENTS

| 3,117,348 | 1/1964 | Rees | 425/136 X |
| 3,386,133 | 6/1968 | Weiner | 425/153 |
| 2,415,462 | 2/1947 | Cherry et al. | 425/DIG. 45 |
| 2,801,442 | 8/1957 | Moslo | 425/DIG. 45 |

FOREIGN PATENTS OR APPLICATIONS

| 854,902 | 11/1960 | Great Britain | 425/153 |
| 1,088,881 | 9/1954 | France | 425/151 |

Primary Examiner—J. Howard Flint, Jr.  
Attorney—Baldwin, Egan, Walling & Fetzer

[57] ABSTRACT

A safety device for a machine mechanism having relatively movable pressure applying operating portions such as a molding machine having relatively movable mold platens, with movable means for shielding the area between said platens when the shielding means is in closed position, for preventing inadvertent insertion of an extremity such as the arm or hand of a workman between the platens during closure thereof, and with the safety device being mechanical and operative to positively stop closure of the platens when the shielding means is out of its closed position. The safety device takes the form of mechanical abutments adapted for holding coaction in connection with the relatively movable platens to prevent the closure thereof in the event that the shielding means is disposed in non-closed position.

12 Claims, 11 Drawing Figures

PATENTED NOV 13 1973 3,771,936

INVENTOR
ERNEST P. MOSLO
BY
Baldwin, Egan, Walling & Fetzer
ATTORNEYS

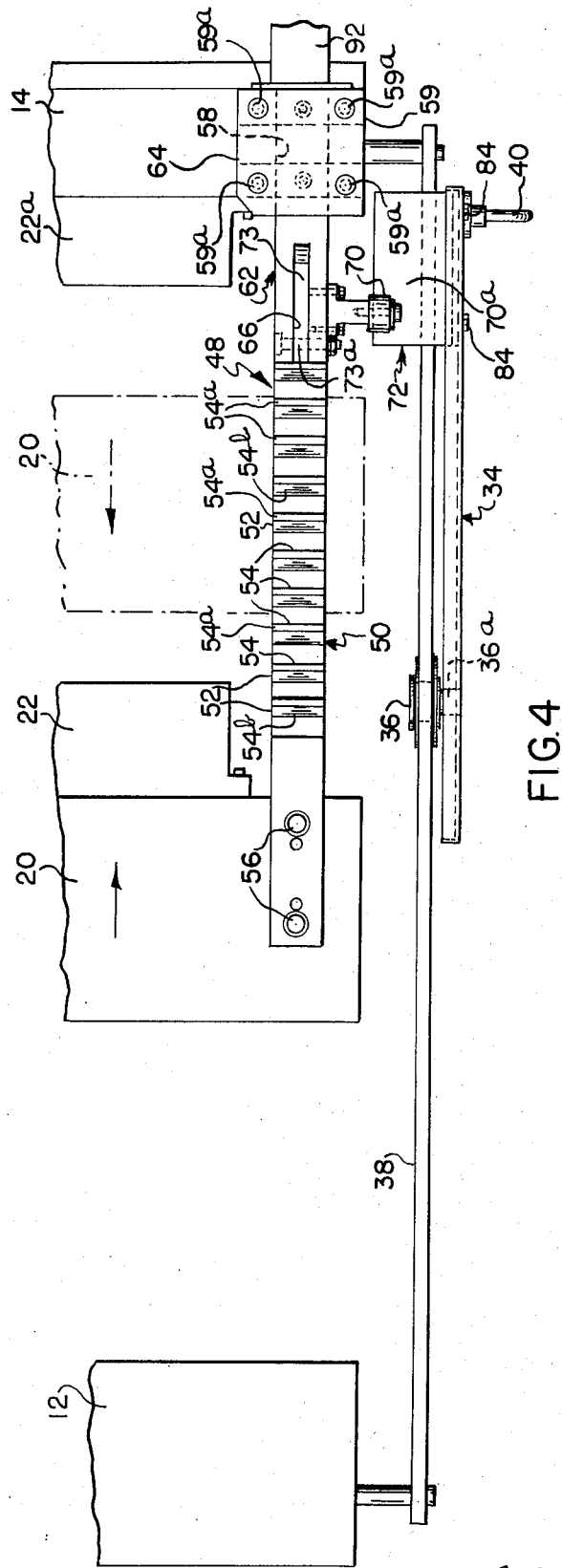

SAFETY DEVICE FOR MOLDING MACHINE

This invention relates to improvements in machine mechanisms and more particularly to a safety device for preventing the closure of relatively movable pressure applying operating portions of the machine, such as for instance a plastic molding machine of the type having relatively movable platens.

BACKGROUND OF THE INVENTION

In machines having relatively movable operating members, such as for instance, plastic molding machines, wherein relatively movable mold supporting platens move from an open position to a closed position and vice versa during closing and opening movements of the molds, there is always the danger present that a workman may have one of his extremities, such as a hand or an arm, extended between the operating members (e.g. the relatively movable platens) during closure thereof. This, of course, can result in serious injury to or severance of the workman's extremity. Various mechanisms have been proposed in the past for physically preventing a workman from inserting an extremity between the relatively movable operating members during closing thereof.

In U.S. Pat. No. 3,505,708 issued Apr. 14, 1970 to Ernest P. Moslo and entitled Fluid Power Actuated Clamp For Molding Apparatus, there is disclosed a fluid powered actuated clamp for a plastic molding apparatus wherein the present safety mechanism may be expeditiously utilized. Such molding apparatus may conventionally include sliding screening panels or shielding means which have to be moved by the workman to a closed position, for shielding the space between the relatively movable platens during closure thereof, so as to prevent the workman from inserting his hand or arm between the closing platens. Such mechanism conventionally may have an electrical switch circuit on the machine so that unless the shielding means is in closed position so as to prevent to workman from inserting his arm into the space or area between the movable platens, the power to close the platens cannot be applied thereto. However, it is possible that such switch circuit may fail, such as for instance by the switch thereof remaining in a closed position even after the shielding means is opened. Thereafter of course the workman would be exposed to the danger of being able to close the platens while his arm or hand was inserted between the relatively movable platens when shielding means was not in closed position.

SUMMARY OF THE INVENTION

The present invention provides a mechanical safety device, which may be used in conjunction with other safety devices, such as the aforediscussed electrical circuit safety device, and which is operable to positively prevent a closure of relatively movable operator or platen members of a power machine mechanism, and as those of the molding machine of aforediscussed U.S. Pat. No. 3,505,708, unless a shielding panel or door is in closed position. In the form illustrated, the safety device comprises a rack-like member which is attached to the movable platen of the molding machine and moves therewith, and a movable abutment member mounted to the stationary platen of the machine. The shielding door or panel has cam means thereon which is operable to deactuate the movable abutment from coaction with the rack when the shielding panel is in closed position, therefore permitting the mold platens to close when the shielding panel is in closed position. However, when the shielding panel is in non-closed position, the movable abutment, being non-deactuated by the shielding panel, moves into abutting coaction with the rack-like member and is operable to prevent closure of the mold platens. The power circuit of the main actuator to the movable platens has pressure relief means associated therewith, so that when the mechanical safety device prevents closure of the platens, the power being applied to the main actuator is bypassed from the main actuator, to prevent damage thereto.

Accordingly, an object of the invention is to provide a novel mechanical safety device for relatively movable pressure applying operator members of a mechanism, so as to prevent closure of the operator members unless a shielding means for the operator members has first been closed.

Another object of the invention is to provide a molding machine having relatively movable platens and wherein there is provided a movable shielding means that is operable when closed to normally prevent a workman from inserting an extremity between the relatively movable platens during closure thereof and wherein mechanical safety means of the aforedescribed type is provided in conjunction with the machine for preventing closure of the platens in the event that the shielding means is not disposed in closed position.

Another object of the invention is to provide a molding machine of the plastic injection type having a movable platen and a stationary platen for supporting mold sections thereon, and with there being provided a movable safety shield which when in closed position is adapted to prevent a workman from inserting one of his extremities, such as an arm, between the closing platens, and wherein a rack member is attached to the movable platen and an abutment bar is movably mounted to the stationary platen so that the abutment bar will move into abutting coaction with the rack to mechanically prevent closure of the movable platen toward the stationary platen in the event that the movable shield is not disposed in closed position, and with the abutment bar being automatically moved out of coaction with the rack when the shield is in closed position, so as to permit closure of the platens.

Other objects and advantages of the invention will be apparent from the following description taken in conjunction with th accompanying drawings wherein:

DESCRIPTION OF DRAWINGS

FIG. 4 is a fragmentary, top plan view taken generally along the plane of line 4—4 of FIG. 3, looking in the direction of the arrows, and illustrating the mechanical safety mechanism of the invention;

DESCRIPTION OF THE PREFERRED EMBODIMENTS

Figure 1:
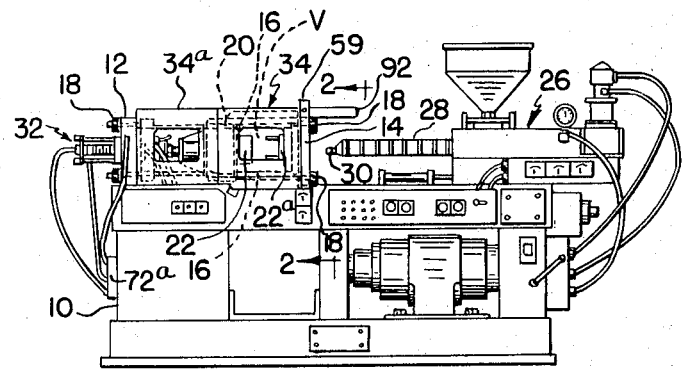
FIG. 1 is a reduced size, side elevational view of a molding machine embodying the invention.
Figure 5:
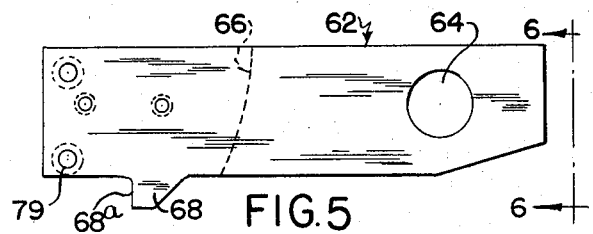
FIG. 5 is an enlarged, side elevation view of the abutment bar of the safety device, which is adapted for pivotal movement toward and away from coaction with the rack member of the safety device.
Figure 6:
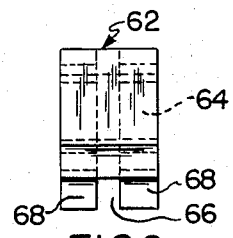
FIG. 6 is an end elevational view taken generally along the plane of 6—6 of FIG. 5, looking in the direction of the arrows.

Referring now again to the drawings and particularly to FIG. 1, there is disclosed a molding machine of the horizontal plastic injection type embodying the present invention. The molding machine may comprise a base 10 which may be of hollow construction for housing mechanism as necessary to operate the molding machine. The base may have a first support 12 mounted thereon adjacent one end thereof and a second support 14 in the form of a stationary platen mounted on the base in longitudinally spaced relation to support 12.

Bars or rails 16 of cylindrical configuration in the embodiment illustrated, extend between supports 12 and 14, and may be secured thereto as by means of threaded nuts 18. Rails 16 provided supports on which is mounted a movable platen 20 which is adapted for movement toward and away from the stationary platen 14. Mold sections 22, 22a (FIG. 1) may be secured as by means of conventional fasteners to the respective platen, and are adapted for mating relation upon closure of the platens and thus closure of the mold sections, to provide a mold cavity for receiving mold material therein.

Mounted adjacent the outer end of base 10 there may be provided a plastic injection mechanism 26 which may be of conventional type, including a screw or ram injector 28 for injecting the plastic material into the closed mold and via nozzle means 30. Power actuator mechanism 32 is provided adapted for coacting with the movable platen 20 for moving the movable platen toward and away from the stationary platen 14 and for clamping the mold sections tightly together during the molding process. Reference may be had to aforementioned U.S. Pat. No. 3,505,708 for a more detailed discussion of the operation of actuator 32 and movable and stationary platens 14 and 20 in conjunction with injection mechanism 26.

As shown in FIGS. 1-4, the molding machine is provided with screening or shielding means comprising in the embodiment illustrated movable panels 34, 34a. Shielding panels 34, 34a may have flanged rollers 36 (FIGS. 2 and 3) rotatably mounted thereon and as by means of stub axles 36a (FIG. 2) which coact with tracks 38 extending between the supports 12 and 14, for guiding the movement of the shielding panels from open to closed position and vice versa. Panel 34 is the panel that shields the volume or area V (FIG. 1) between the relatively movable platens 20, 14 of the molding machine, and may be provided with a handle 40 (FIG. 3) which is adapted for manual manipulation by the machine operator, to open and close the panel 34 in the process of obtaining entry to the space between the molding platens 20, 14. Glass covered sight openings 41 may be provided in panels 34, 34a.

Figure 3:
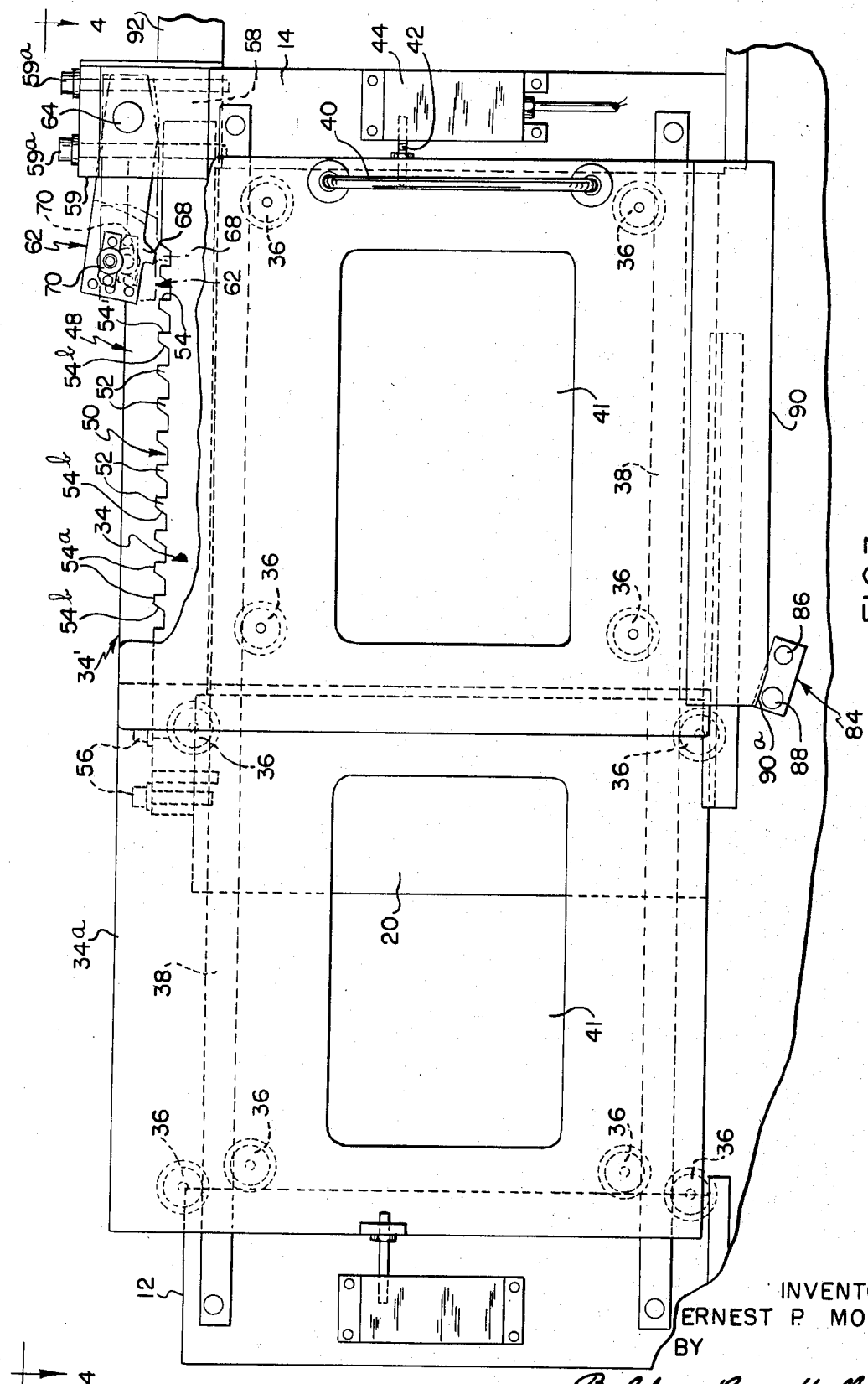
FIG. 3 is a side elevational view taken generally along the plane of line 3—3 of FIG. 2 looking in the direction of the arrows, and illustrating the shielding means on the machine which when in closed position, prevent inadvertent insertion of the machine operator's arm into the area between the relatively movable platens of the machine, and illustrating the mechanical safety mechanism of the invention mounted on the movable platen and on the stationary platen, for preventing movement of the movable platen toward the stationary platen in the event that the shielding means is not in closed condition; as illustrated, the shielding means is shown in closed position, and the mechanical safety mechanism is in deactuated condition.

As can best be seen in FIG. 3, panel 34 may be provided with an actuator 42 adjustably secured thereto, which is adapted to coact with an electrical switch mechanism 44 mounted on stationary platen 14 for closing the switch mechanism 44 to permit the application of power to the main actuator mechanism 32 of the molding machine, when the shielding panel 34 is disposed in closed position, so that the movable platen 20 and its associated mold section 22 can be moved toward the stationary platen 14 and its associated mold section 22a, to close the mold sections during the molding operation. Movement of the shielding panel 34 to the left (with reference to FIG. 3) may deactuate the switch 44 and cut off the power circuit to main actuator mechanism 32, so that actuation of the actuator 32 to close the platens is not possible unless and until switch 44 has been reactuated. However, as aforementioned, the switch mechanism 44 could fail or become jammed, and the circuit to the actuator 32 for moving the movable platen 20 toward the stationary platen 14 would still be operative even though the shielding panel 34 and its associated switch actuator 42 has moved away from closed position, thus presenting a situation where an operator could extend his arm into the space V between the plates and have an injury occur to the workman upon closing of the platens.

Figure 2:
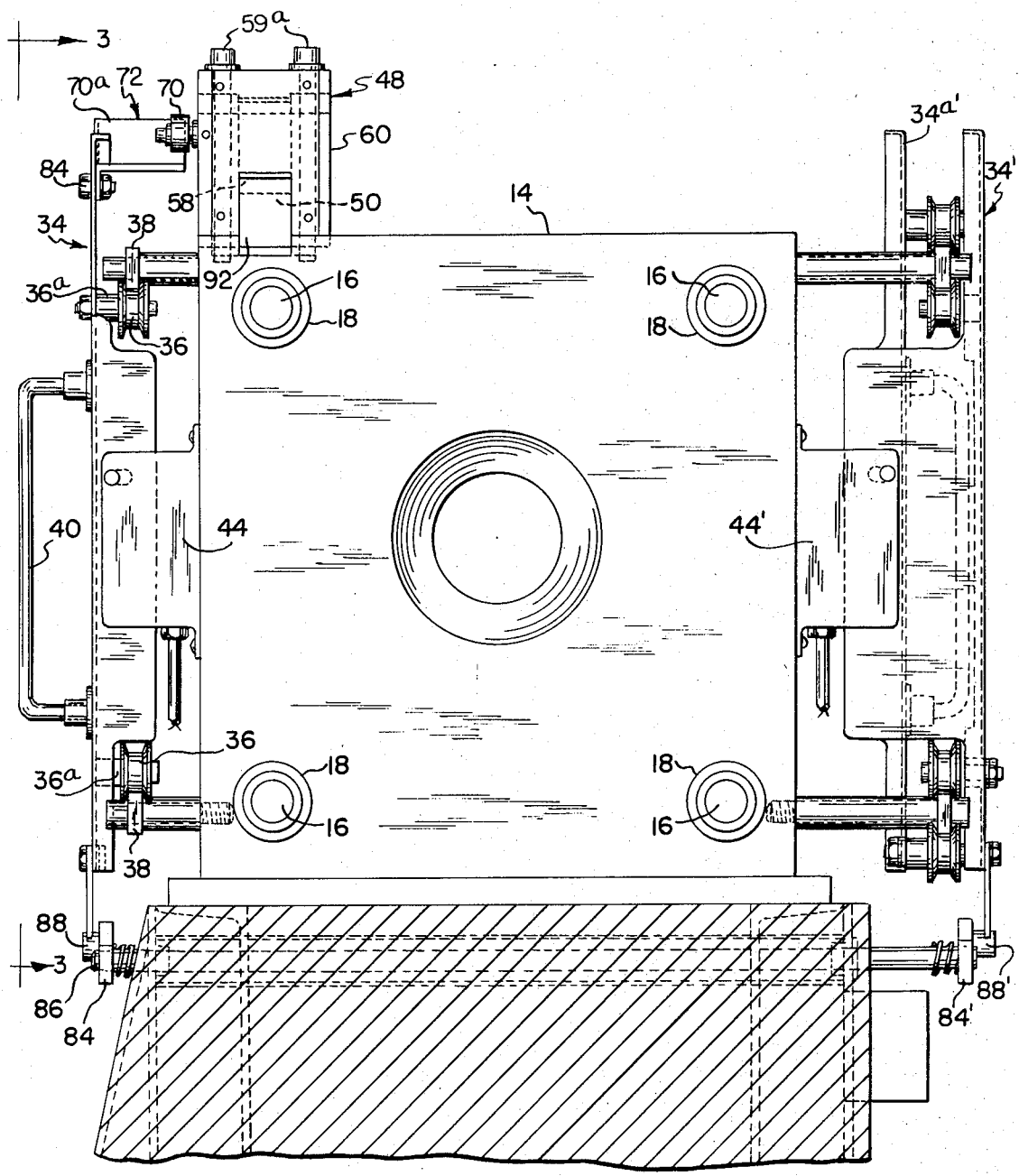
FIG. 2 is an enlarged sectional view taken generally along the plane of line 2—2 of FIG. 1 looking in the direction of the arrow.

As can be seen in FIG. 2, these shielding panels may be provided on both sides of the machine, with both sides being provided with the aforementioned safety switch means 44. However, the operator of a machine generally works from only one side thereof, and thus the opposite side is generally maintained in closed condition by the shielding panels unless maintainence or the like is occurring on the machine. Ordinarily, during ordinary molding operations, the machine operator is working from the side of the machine illustrated in FIG. 1. The aforementioned generally closed panels on the opposite side of the machine are designated with like reference numbers as the first side with suffix prime (') added thereto.

In accordance with the present invention, safety mechanism 48 of a mechanical type, is provided for positively preventing closure of the relatively movable platens in the event that the shielding door or panel 34 is not in closed position, so that even if the safety switch mechanism 44 would happen to fail as aforediscussed, the movable platen 20 could still not be moved toward the stationary platen 14. In the embodiment illustrated, this mechanical safety mechanism comprises a rack-like member 50 having a series of tooth abutments 52 laterally spaced from one another along a portion of the lengthwise extent of member 50. Each tooth member 52, as can best be seen in FIG. 3, comprises a generally vertical downstream abutment surface 54, a substantially flat top surface 54a, and a sloping upstream surface 54b. Member 50 may be rigidly secured to the movable platen 20, as by means of bolts 56 and is adapted to move linearaly with movement of the movable platen, toward and away from the stationary platen 14. The distal or free end of rack 50 is received in an opening 58 in a support housing 59 mounted as by means of bolts 59a to stationary platen 14.

Figure 7:
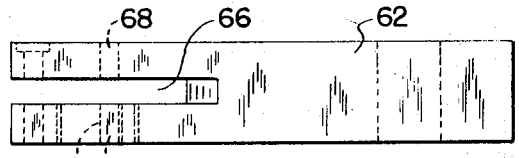
FIG. 7 is a top plan view of the abutment bar of FIG. 5.
Figures 8, 9:
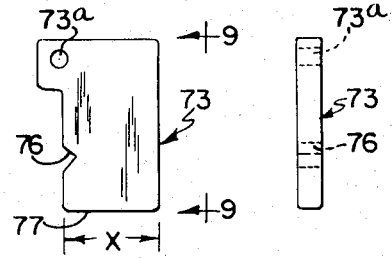
FIG. 8 is an enlarged side elevational view of the movable blade member which is assembled with the abutment bar of FIG. 5, for providing for smooth movement of the rack of the safety device relative to the abutment bar, during opening movement of the platens.
FIG. 9 is an elevational view taken generally along the plane 9—9 of FIG. 8 looking in the direction of the arrows.
Figure 10:
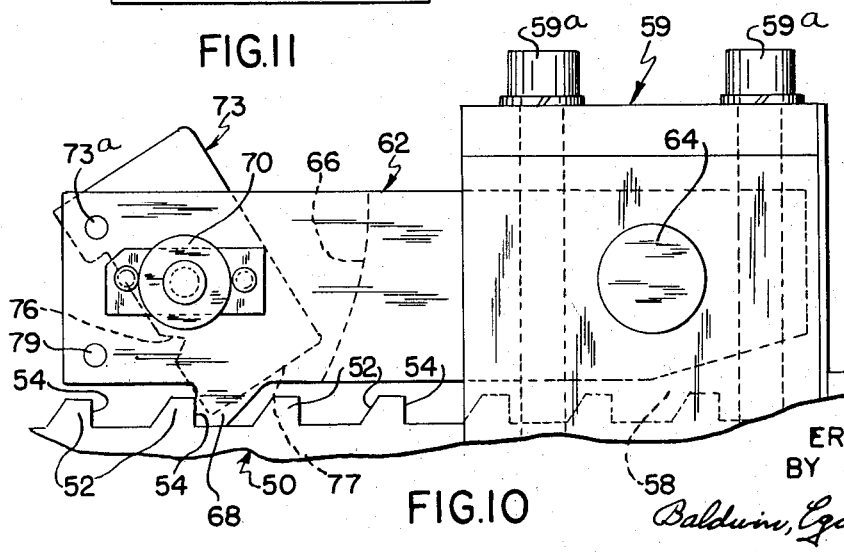
FIG. 10 is an enlarged, fragmentary, side elevational view showing the coaction of the locking abutment bar with the toothed rack, so as to prevent closure of the platens, when the shield of the machine is not positioned in closed position during closing movement of the platens; the rearwardly swing position of the blade member in the active position of the abutment bar is shown.

Mounted on the housing 59 above opening 58 therethrough is abutment means in the form of a drop bar 62 pivoted as at 64 to housing 59, for pivotal movement in a generally vertical plane. Abutment bar 62 comprises an elongated member bifurcated as at 66 (FIG. 7) and having depending abutment shoulders or teeth 68 on the bifurcated portion 66. Each abutment shoulder 68 presents a generally vertical abutment surface 68a which is adapted for abutting coaction with abutment surface 54 on a confronting one of the teeth 52 of rack member 50, when the abutment bar is disposed in downwardly pivoted, operative abutting coacting relation with the rack 50, for positively preventing movement of the movable platen 20 toward the stationary platen 14, and as shown for instance in FIG. 10. As will be seen, due to the location of pivotal axis 64 of abutment bar 62, the bar tends to move downwardly toward the rack 50 due to gravity.

The abutment bar may be provided with a roller member 70 (FIG. 2) projecting laterally therefrom, with roller member 70 being adapted for camming coaction with a cam 72 on the shielding panel 34, when the panel 34 is in closed position (FIG. 2). As can best be seen in FIGS. 2 and 3, when the cam 72 engages the roller 70, the roller moving along the sloping top surface 70a of the cam, causes the abutment bar 62 to be pivoted upwardly, so that the abutment shoulders 68 on the abutment bar 62 clear the teeth of rack 50. Accordingly, since the shoulders are out of interferring relation with the rack, the main actuator 32 on the molding machine can move the movable platen 20 and its associated mold section 22 toward the stationary platen 14 and its associated mold section 22a, to close the mold sections and thus provide the mold cavity for the molding operation. However, when the shielding panel 34 is not in closed position, then of course the weight of the abutment bar 62 causes it to pivot downwardly about its pivotal axis 64 thereby causing the shoulders 68 to mate with a confronting one of the teeth on the underlying abutment rack 50, and mechanically prevent further movement of the movable platen 20 toward the stationary platen 14.

The circuit to the main actuator 32 can be provided with relief means 72a so that in the event that abutting holding coaction occurs between the abutment bar and the rack 50, the power applied to the actuator 32, which may be for instance a hydraulic actuator, is by-passed to resvoir, so as to prevent injury or damage to the main actuator, and in a known manner.

The injection molding machine may be effectively used with great plurality of sizes of mold sections 22, 22a so that of course many different items can be produced on the machine. The safety mechanism with the elongated rack 50 is such that it will operate effectively to prevent closure of the platens unless the shielding means 34 is in closed condition, irrespective of the size of mold section on the platen for production of the desired item. In other words the molds can be changed on the machine without any necessity of adjusting the safety mechanism to accommodate a different size mold arrangement.

As can be best seen in FIGS. 5-10, the abutment bar 62 is provided with a blade member 73 which is a plate-like article pivoted adjacent one of the corners thereof as at 73a to the distal end of the abutment bar 62, so that the blade can swing in a generally vertical plane within the bifurcated portion 66 of the abutment bar. The blade 73 may be provided with a notched section 76 (FIG. 8) which is adapted for engagement with pin stop 79 extending across the bifurcated portion 66 of the abutment bar 62, so as to limit clockwise (with reference to FIG. 10) pivotal movement of the blade 73. In other words, blade 73 is freely swingable within the bifurcated portion 66 of the abutment bar 62, with gravity tending to cause downward swinging movement thereof about pivot 73a.

The purpose of the blade 73 is to provide for smooth movement of the rack 50 relative to the abutment bar 62 during opening movement of the mold, or in other words, when the movable platen 20 is moving away from the stationary platen 14. As can be best seen in FIGS. 8 and 10, the width X of the blade 73 is such that it spans the distance between adjacent abutment teeth 52 on rack 50. Accordingly, in the event that the shielding panel 34 is moved from a closed to an open position disengaging cam 72 from roller 70 on the abutment bar, so that the abutment bar 62 swings downwardly, the blade 73, which when in its downwardly swing position and in engagement with stop 79 extends slightly below abutment shoulders 68, will ride on the top surfaces 54 of teeth 52 of rack 50 and will hold the abutment bar 62 and its associated abutment shoulders 68 above the level of the teeth on rack 50. As the movable platen 20 moves away from the stationary platen 14, the blade 73 rides smoothly along the top surfaces of the abutment teeth 52 on the rack 50 while holding abutment shoulders 68 above the rack teeth, and thus provides for smooth linear movement of the rack relative to the abutment bar during opening movement of the mold, and when the shielding panel 34 is in open position. It will be seen that the drag of the rack 50 on the underside 77 of the blade 73, holds the blade in a generally vertical position, with stop 79 engaging notch 76 of the blade 73.

Figure 11:
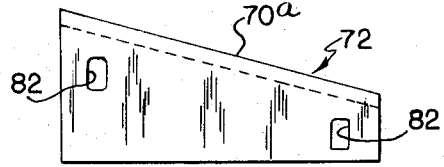
FIG. 11 is an enlarged side elevational view of the cam on the shielding means of the machine which deactuates the mechanical safety mechanism in the closed condition of the shielding means.

As may be seen from FIG. 11, cam 72 may have vertically elongated slots 82 through which are received fasteners 84 (FIG. 2), with such slots providing means for adjusting the position of the cam 72 on the inner side of shielding panel 34. In connection with shielding panel 34, a spring loaded bracket 84 (FIGS. 2 and 3) may be pivoted as at 86 to base 10. Bracket 84 may be provided with roller 88 adapted for coaction with the underside surface 90 of the shielding panel during lengthwise movement of the panel on the mechanism.

Surface 90 may include oblique section 90a adapted for camming coaction with roller 88 to urge shielding panel 34 into finalized closed position and provide an initial resistance to opening movement of the shielding panel.

Cover housing 92 (FIGS. 1 and 3) may be secured to support housing 59 in alignment with opening 58 therethrough for receiving the distal end of rack 50 during closing movement of the platens.

From the foregoing discussion and accompanying drawings it will be seen that the invention provides a novel mechanical safety apparatus for a mechanism having relatively movable, powered operating portions which are openable and closeable with respect to one another, and wherein injury to a workman might occur if one or more of his extremities are positioned between the movable operating portions when the portions close, and a safety mechanism which operates positively to prevent closure of the relatively movable operating portions of the mechanism unless a shielding means is first disposed in closed condition. The shielding means is for the purpose of preventing insertion of a workman's extremity between the movable operating portions during closure thereof. The relatively movable operating portions may be, for instance the platens of an injection molding machine, and the safety apparatus is such that it operates effectively with a great plurality of different sizes of mold sections for use with the platens of the machine.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. In a machine mechanism having a pair of relatively movable, spaced pressure applying operating portions, power means for causing opening and closing movement between said operating portions, means movable from an open position to a closed position and vice versa for screening when in said closed position, the area between said operating portions to prevent inadvertent insertion of a workman's extremity between the operating portions during dlosing movement thereof, mechanical safety means coacting with said operating portions operative to stop closing movement of the latter unless said screening means is in said closed position, said safety means comprising a toothed rack-like member attached to one of said operating portions and a movable abutment member supported by the other of said operating portions, the last mentioned members being adapted for abutting holding coaction upon closing movement of said operating portions when said screening means is in non-closed position, said movable abutment member including means for coaction with means on said screening means when the latter is disposed in said closed position, for moving said abutment member to a deactuated position where it is maintained out of holding coaction with said rack-like member so long as said screening means remains in said closed position.

2. A mechanism in accordance with claim 1 wherein said movable abutment member comprises a drop bar pivotally mounted adjacent one end thereof to said other of said operating portions and having a depending abutment tooth thereon for holding coaction with said toothed rack-like member, to prevent closing movement of said operating portions when said screening means is in non-closed position.

3. A mechanism in accordance with claim 1 wherein the mechanism is a longitudinally operating molding machine, said operating portions comprising a stationary platen and a movable platen, and said means on said screening means and on said abutment member comprising camming means for lifting said abutment member to a deactuated position wherein it is maintained out of holding coaction with said rack-like member when said screening means is in said closed position.

4. A mechanism in accordance with claim 1 wherein said operating portions comprise a pair of relatively movable platens, said screening means comprising a generally vertically oriented longitudinally slidable door so as to open and close accessibility to the area between said platens, and said means on said screening means comprising a cam mounted on the inner side of said door for coaction with said means on said abutment member, for deactivating said safety means to permit movement of said platens toward closing position when said door is in closed position, said means on said abutment member comprising a laterally disposed roller for riding on said cam.

5. A mechanism in accordance wtih claim 1 wherein said mechanism comprises an injection molding machine, said operating portions comprising platens including a stationary platen having means thereon for mounting a mold section and a movable platen likewise having means thereon for mounting a mold section for coaction with the first mentioned mold section for defining a mold cavity, and said rack-like member being secured to said movable platen for movement therewith and relative to said stationary platen, said rack-like member extending lengthwise in the direction of said stationary platen with the teeth thereof pointing upwardly, said abutment member comprising a drop bar having depending abutment tooth means thereon for holding coaction with confronting of the teeth on said rack-like member in the active position of said safety means, said bar being pivotally mounted adjacent one end thereof on said stationary platen for swinging movement in a generally vertical plane.

6. A molding machine in accordance with claim 1 wherein said safety means includes means for coaction with said rack-like member for reducing the noise of return of the movable operating portion toward open position when said screening means is disposed out of closed position, said means for reducing noise when coacting with said rack-like member being operable to maintain said abutment member out of engagement with said rack-like member.

7. A mechanism in accordance with claim 6 wherein said abutment member comprises a drop bar pivoted to said other operating portion, said means for reducing the noise of return including a plate pivoted to said drop bar, said plate when in a generally vertical position extending below said drop bar for riding engagement with said rack-like member to lift said drop bar above the teeth of said rack-like member, said plate being pivotal with respect to said rack-like member rearwardly during closing movement of said operating portions to a position wherein it no longer extends below said drop bar.

8. A molding machine in accordance with claim 5 wherein a support member is eccentrically pivoted to said drop bar for movement in a generally vertical plane co-planar with the plane of swinging movement of said drop bar, and extends downwardly from said drop bar when in actuated position, said support member being engageable by said rack-like member on movement of said movable platen toward said stationary platen to cause rearward pivoting of said support member to deactuated position, said support member moving by gravity to said actuated condition wherein it extends downwardly below said drop bar and rides on said rack-like member when said movable platen and attached rack-like member move away from said stationary platen and said screening means is out of said closed position, and stop means on said drop bar for engagement with said support member for limiting the pivotal movement of said support member in at least one pivotal direction.

9. A mechanism in accordance with claim 5 wherein the teeth of said rack-like member are of buttress-like type spaced longitudinally therealong with the vertical surface of each tooth being on the downstream side thereof and the sloping face of each tooth being on the upstream side thereof, said generally vertical face being for abutting coaction with said drop bar when said safety means is in operative position to prevent closure of said operating portions of said mechanism.

10. A mechanism in accordance with claim 9 wherein said tooth means of said drop bar includes laterally spaced abutment shoulders thereon adapted for said abutting coaction with said vertical face when said drop bar is in said operative position.

11. A mechanism in accordance with claim 5 including a housing on said stationary platen receiving said rack-like member therein upon movement of said movable platen toward said stationary platen.

12. A mechanism in accordance with claim 4 including means for coaction with said door to resiliently urge said door into said closed position and resiliently resist opening movement thereof.

* * * * *